(12) United States Patent
Virella

(10) Patent No.: US 9,117,205 B2
(45) Date of Patent: Aug. 25, 2015

(54) SYSTEMS AND METHODS FOR INCENTIVIZING FOOD WASTE RECYCLING

(71) Applicant: Eddie Oquendo Virella, Norwich, CT (US)

(72) Inventor: Eddie Oquendo Virella, Norwich, CT (US)

(73) Assignees: Eddie Oquendo Virella, Norwich, CT (US); Helen Hong Yu, Norwich, CT (US)

( * ) Notice: Subject to any disclaimer, the term of this patent is extended or adjusted under 35 U.S.C. 154(b) by 110 days.

(21) Appl. No.: 13/784,306

(22) Filed: Mar. 4, 2013

(65) Prior Publication Data

US 2013/0228623 A1    Sep. 5, 2013

Related U.S. Application Data

(60) Provisional application No. 61/606,833, filed on Mar. 5, 2012, provisional application No. 61/610,766, filed on Mar. 14, 2012.

(51) Int. Cl.
| | | |
|---|---|---|
| *G06F 19/00* | (2011.01) | |
| *G06Q 10/00* | (2012.01) | |
| *G06K 7/10* | (2006.01) | |
| *G07F 17/20* | (2006.01) | |
| *G07F 7/06* | (2006.01) | |

(52) U.S. Cl.
 CPC  *G06Q 10/30* (2013.01); *G06K 7/10* (2013.01); *G07F 7/0609* (2013.01); *G07F 17/20* (2013.01)

(58) Field of Classification Search
 USPC .................................................. 235/454, 385
 See application file for complete search history.

(56) References Cited

U.S. PATENT DOCUMENTS

| | | | | |
|---|---|---|---|---|
| 3,884,374 | A | * | 5/1975 | Swallow, Jr. .................. 414/536 |
| 4,063,903 | A | * | 12/1977 | Beningson et al. ............. 44/629 |
| 5,222,446 | A | * | 6/1993 | Edwards et al. ............... 110/235 |
| 6,068,032 | A | | 5/2000 | Milner |
| 8,245,848 | B2 | | 8/2012 | Tolibas-Spurlock et al. |
| 8,246,824 | B2 | | 8/2012 | Larin |
| 8,365,943 | B2 | | 2/2013 | Bentley |
| 8,377,264 | B2 | | 2/2013 | Tokuda et al. |
| 2004/0256023 | A1 | | 12/2004 | Camoli |
| 2008/0099098 | A1 | | 5/2008 | Henecke |
| 2010/0264079 | A1 | * | 10/2010 | Begin et al. ................... 210/603 |
| 2013/0319262 | A1 | * | 12/2013 | Cathcart ......................... 100/39 |

FOREIGN PATENT DOCUMENTS

| | | |
|---|---|---|
| EP | 2211316 | 7/2010 |
| JP | 2010222119 | 10/2010 |
| KR | 100817607 | 3/2008 |
| KR | 101020241 | 3/2011 |
| KR | 101028570 | 4/2011 |
| KR | 101113174 | 2/2012 |
| KR | 101145908 | 5/2012 |
| KR | 101155269 | 6/2012 |
| KR | 20120077624 | 7/2012 |
| WO | WO2011132886 | 10/2011 |
| WO | WO2012032213 | 3/2012 |
| WO | WO2012121539 | 9/2012 |

* cited by examiner

*Primary Examiner* — Daniel Hess
(74) *Attorney, Agent, or Firm* — Foley & Lardner LLP

(57) ABSTRACT

An apparatus for receiving waste contained in a container. The apparatus including a housing and a receiving mechanism coupled to the housing. The receiving mechanism is configured to receive the container. The apparatus further includes an analysis mechanism coupled to the housing; the analysis mechanism is configured to analyze the container.

6 Claims, 8 Drawing Sheets

SYSTEMS AND METHODS FOR INCENTIVIZING FOOD WASTE RECYCLING

CROSS-REFERENCE TO RELATED PATENT APPLICATIONS

This application claims the benefit of U.S. Provisional Patent Application No. 61/606,833, titled "An electronic machine for the collection of bio-plastic bottles designed to store food waste and used cooking oil for recycling," filed on Mar. 5, 2012 and U.S. Provisional Patent Application No. 61/610,766, titled "An electronic storage machine that weighs food waste and organic waste collected and then, calculates its weight and gives an instant incentive to the users of this system," filed on Mar. 14, 2012, both of which are incorporated by reference in their entireties.

BACKGROUND OF THE INVENTION

The present invention relates generally to the field of waste collection. Leftover food scraps have beneficial uses. For example, food scraps may be composted into nutrient rich soil additives and may also be used for raw material for energy production by the extraction of oils or through anaerobic digestion for the production of bio-energy. Used cooking oil also has beneficial uses. For example, the used cooking oil may be processed into a bio-fuel such as biodiesel. Often, however, food scraps and leftover cooking oil go to waste by being thrown into the trash.

SUMMARY OF THE INVENTION

An exemplary embodiment relates to an apparatus for receiving waste contained in a container. The apparatus includes a housing and a receiving mechanism coupled to the housing. The receiving mechanism is configured to receive the container. The apparatus further includes an analysis mechanism coupled to the housing; the analysis mechanism is configured to analyze the container. The apparatus includes a first compartment within the housing. The first compartment is configured to store the container. The apparatus further includes a movement mechanism coupled to the housing. The movement mechanism is configured to transport the container from the receiving mechanism to first compartment. The apparatus includes a refrigeration unit coupled to the housing. The refrigeration unit is configured to refrigerate the first compartment. The apparatus includes a display coupled to the housing and a printer coupled to the housing.

Another exemplary embodiment relates to an apparatus for receiving a waste. The apparatus includes a housing and a container within the housing. The container is configured to store the waste. The apparatus further includes a receiving area configured to receive the waste. The apparatus includes a grinding mechanism configured to grind the waste prior to the waste entering the container. The apparatus includes a conveyor configured to transport the waste from the receiving area to the grinding mechanism. The apparatus further includes a refrigeration unit coupled to the housing and configured to refrigerate the container. The apparatus includes a scale coupled to the housing and configured to weigh contents of the container. The apparatus further includes a display coupled to the housing and a printer coupled to the housing.

Yet another exemplary embodiment relates to a method of providing an incentive to a user for depositing waste in a waste collection machine. The method includes receiving waste from the user in a receiving portion of the waste collection machine, wherein the waste includes any of food scraps and oil. The method further includes analyzing the received waste to determine a characteristic of the received waste. The method includes storing the received waste in a refrigerated compartment of the waste collection machine. The method further includes determining the incentive based on the characteristic of the received waste. The method includes providing the incentive to the user.

The invention is capable of other embodiments and of being carried out in various ways. Alternative exemplary embodiments relate to other features and combinations of features as may be generally recited in the claims.

The foregoing is a summary and thus by necessity contains simplifications, generalizations, and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION OF THE PREFERRED EMBODIMENTS

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting. Unless otherwise specified, "a" or "an" means "one or more."

Figure 1:
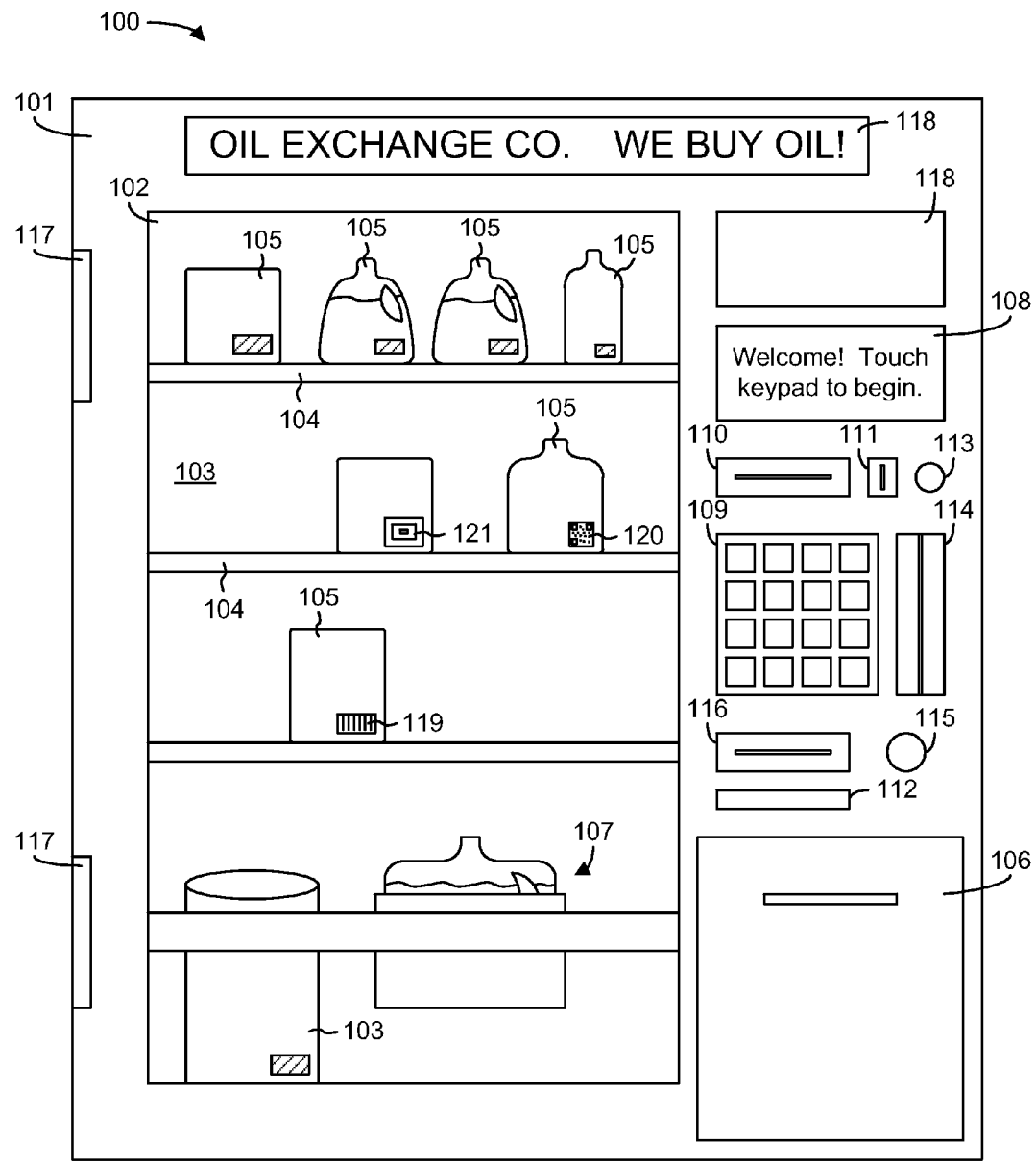
FIG. 1 is a front view of a waste collection machine according to an exemplary embodiment.

Referring to FIG. 1, a waste collection machine 100 is shown according to an exemplary embodiment. Machine 100 includes housing 101. Housing 101 includes window 102. Refrigerated compartment 103 is visible through window 102. Refrigerated compartment 103 includes at least one shelf 104 for holding containers 105. Refrigerated compartment is cooled by refrigeration unit 122 (shown in FIG. 2). Containers 105 may be full of liquids and/or solids or may be empty. Machine 100 may include a separate empty container storage compartment or area (not shown). The empty container storage compartment may be refrigerated. Alternatively, empty containers are stored on shelves 104. Containers 105 are received into machine 100 through access compartment 106. Further, containers 105 may be removed from machine 100 through access compartment 106. Access compartment 106 provides external access to the interior of housing 101. Access compartment 106 may include a hinged door or a pivoting deposit bin. Machine 100 includes container movement mechanism 107. Container movement mechanism 107 is configured to place containers 105 received in access compartment 106 onto shelf 104. Additionally, container movement mechanism 107 is configured to remove containers 105 from a shelf 104 and place the removed container 105 into access compartment 106 (e.g., removing an empty container off of shelf 104 and placing the empty container in access compartment 106 such that a user can remove the container from machine 100). Accordingly, a user of machine 100 can deposit containers 105 into machine 100 and remove containers 105 from machine 100 through access compartment 106.

Machine 100 includes various user-interface devices. Machine 100 includes display 108. Display 108 may be an LCD, OLED, TFT, or any other suitable display. Display 108 presents operational information to a user of machine 100 through a graphical user interface. In some configurations, display 108 is a touch screen display and is configured to receive user input through an interactive graphical user interface. Machine 100 includes keypad 109. Keypad 109 is configured to receive input from a user. Although keypad 109 is drawn as including fifteen buttons, any number of buttons may be included.

Machine 100 is configured to receive payments from a user, provide payments to a user, and provide users with receipts of transactions. Machine 100 includes bill-in/out mechanism 110. Bill-in/out mechanism 110 is configured to receive and return paper currency. Machine 100 includes coin-in mechanism 111 and coin-out mechanism 112. Coin-in mechanism 111 is configured to receive coined currency, and coin-out mechanism 112 is configured to dispense coined currency to a user. Adjacent to coin-in mechanism 111 is button 113, which when pressed is configured to return deposited coins. Machine 100 includes magnetic strip reader/writer 114. Magnetic strip reader/writer 114 is configured to read a magnetic strip and reprogram a magnetic strip (e.g., the magnetic strip of a credit card, the magnetic strip of a debit card, the magnetic strip of a loyalty card, etc.). Machine 100 further includes NCF reader 115, which is configured to read NFC information (e.g., an embedded RFID tag of a credit card, a transmitted RFID signal from a smartphone, etc.). Machine 100 includes printer 116 configured to print receipts, coupons, and/or vouchers.

The front face of housing 101 may pivot away from the other portions of housing 101 to provide maintenance access to the internals of machine 100 (e.g., refrigerated compartment 103, containers 105, internal electronic components, coin hoppers, printer paper, bill stacks, etc.). Accordingly, hinges 117 are provided on housing 101. The front face of housing 101 may be locked into the closed position by a locking mechanism. Housing 101 also includes advertising sections 118. Advertising sections 118 may be holders for printed advertisements or displays.

Machine 100 is generally configured to dispense containers 105, receive containers 105 including food waste (e.g., used cooking oil, food scraps, etc.), and provide an incentive to a user depositing food waste (e.g., a financial incentive, a coupon, a voucher, etc.). Dispensed containers 105 may be empty containers for waste storage and later depositing back into machine 100. Alternatively, dispensed containers 105 may be full of oil (e.g., cooking oil, motor oil, etc.) and are purchased by a user of the machine. Each deposited container 105 is analyzed by container sensors 124 (shown in FIG. 2; e.g., a camera, a scale, a chemical sensor, etc.). In order to assist with container deposits, container withdrawals, and accounting tasks related to the receipt and dispensing of incentives, each container 105 is marked with a unique identifier. The unique identifier is stored as a machine readable code, such as barcode 119, QR code 120, and/or RFID tag 121. Each deposited container 105 may be premarked with machine readable code corresponding to the unique identifier, in which case a label reader 125 (shown in FIG. 2) placed near the access compartment is configured to scan the unique identifier. If a deposited container 105 does not contain a label indicating a unique identifier, a unique identifier is created and a container labeler 126 (shown in FIG. 2) applies a label (e.g., a printed barcode 119) to container 105 prior to container 105 being stored in refrigerated compartment 103. The identifiers are unique to each of the containers 105 and are used to identify the size, weight, contents, date information, and user identification information.

Figure 2:
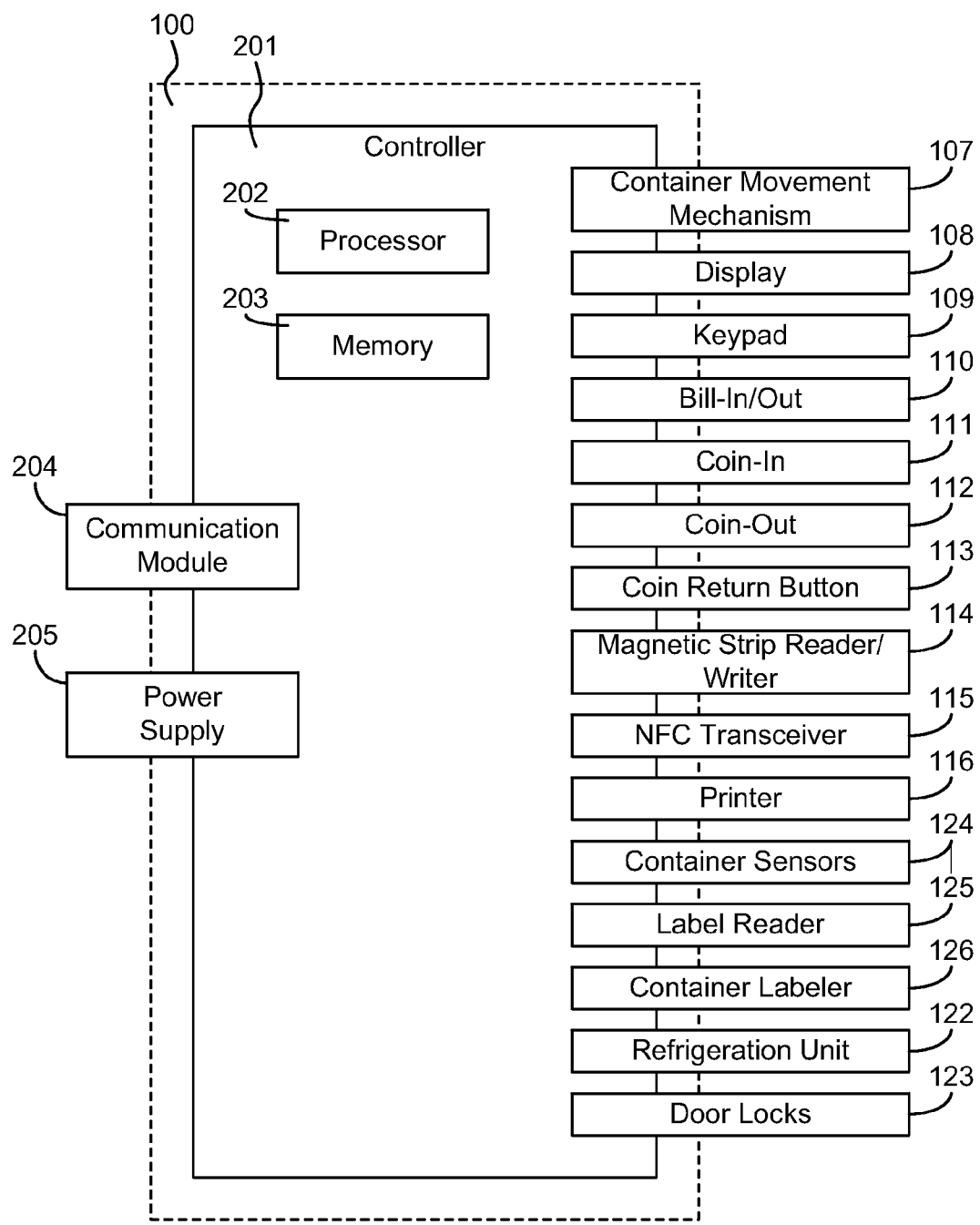
FIG. 2 is a block diagram of the waste collection machine of FIG. 1 according to an exemplary embodiment.

Referring to FIG. 2, a block diagram of controller 201 of machine 100 is shown according to an exemplary embodiment. Machine 100 includes controller 201. Controller 201 includes processor 202 and memory 203. Memory 203 stores programming modules that, when executed by processor 202, control the operation of machine 100. Controller 201 is in communication with and operatively connected to container movement mechanism 107, display 108, keypad 109, bill-in/out mechanism 110, coin-in mechanism 111, coin-out mechanism 112, coin return button 113, magnetic strip reader/writer 114, NFC transceiver 115, and printer 116. Controller 201 is further in communication with and is further operatively coupled to container sensors 124, label reader 125, container labeler 126, refrigeration unit 122, door locks 123, and communications module 204. Communication module 204 is configured to transmit and receive data to and from outside sources (e.g., a central server). Communication module 204 is wired or wireless. Communication module 204 utilizes any of the 802.11 standard networking protocol (e.g., 802.11a/b/g/n), CDMA, GSM, LTE, Bluetooth®, and/or Ethernet. Controller 201 receives instructions from external computing devices through communication module 204 (e.g., operation schedules, shutdown commands, requests for information and statuses, etc.). Controller 201 also sends commands and data to external computing devices through communications module 204. For example, when controller 201 determines that shelves 104 are full, controller 201 may initiate a message to the operator of machine 100 indicating that shelves 104 need to be emptied. Further, controller 201 may upload regular reports, such as usage history, pay-out information, numbers of deposited containers, numbers of containers removed, etc.

Machine 100 and all of the components of machine 100 are powered by power supply 205. The electrical source of power supply 205 is any of grid power, battery power, and/or solar power. It is contemplated that multiple power sources are used (e.g., a primary power source of solar power and a backup power source of grid power in the event the solar power source cannot provide enough electrical energy to operate machine 100).

Figure 3:
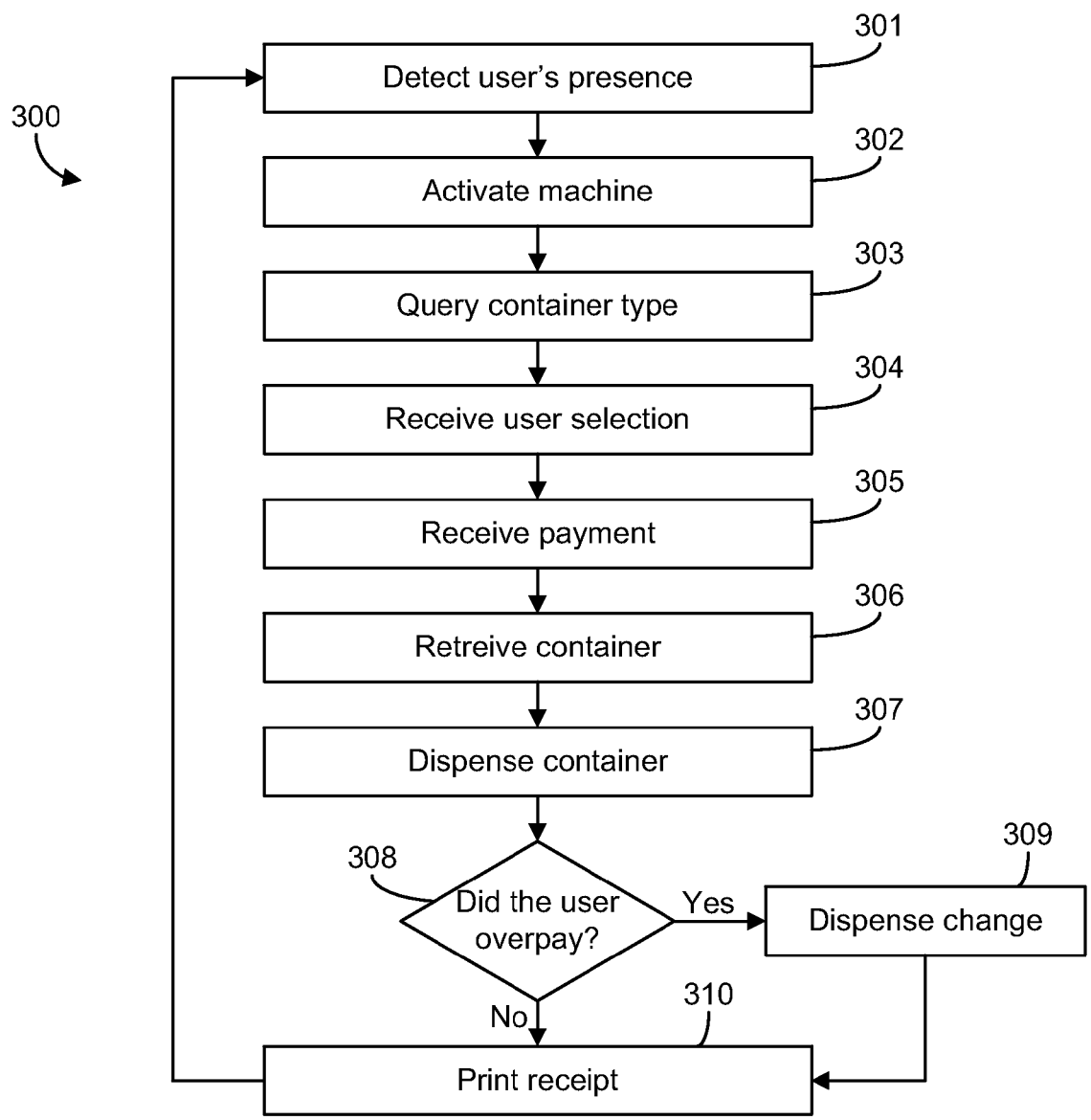
FIG. 3 is a flow diagram of a process of providing a user an empty container through a machine configured to dispense empty containers and receive containers according to an exemplary embodiment.

Referring to FIG. 3, a flow diagram detailing a process 300 of providing a user an empty container through a machine configured to dispense empty containers and receive containers (e.g., machine 100) is shown according to an exemplary embodiment. The method begins when the machine detects the user's presence at the machine (step 301). The user's presence is may be detected by user interaction with a user input (e.g., a touchscreen, a keypad, etc.). Generally, the interaction indicates that the user wishes to receive a container from the machine. Alternatively, the user's presence may be detected by a motion detector or a camera mounted on the machine. In yet another alternative arrangement, the user's presence is detected when the user provides loyalty account identification (e.g., by swiping a loyalty card through a magnetic strip reader of the machine, by tapping an NFC enabled loyalty card on an NFC transceiver of the machine, by transmitting loyalty account information from an NFC enabled mobile device such as a smartphone to the NFC transceiver of the machine, etc.). Once the user's presence is detected, the machine is activated (step 302).

After being activated, the machine queries the type of container the user wishes to receive (step 303). The machine displays a query through a display of the machine to the user. The query asks the user to input the desired container and the desired quantity. Along with the query, the machine uses the display to indicate the types of containers available and the quantity of each type of container available for dispensing. Accordingly, during the query, the displayed information includes an indication of the available container types available and each container type characteristic. For example, the machine may have multiple container sizes available for dispensing (e.g., one liter, two liter, one gallon, etc.) and containers specifically designed to store different types of waste (e.g., containers designed to store liquid waste, containers designed to store solid waste, etc.). The displayed information may include a price for each type of container. The price may be a refundable deposit (i.e., the price may be refunded when the user depots the received container back into the machine) or a purchase cost (of either an empty container or a container filled with oil). Further, the displayed information may further indicate the maximum quantity of each container available. In some arrangements, the machine is configured to dispense a single type of container. In such an arrangement, the query only consists of a quantity inquiry.

In response to the user query, the machine receives a user selection (step 304). The user selection indicates at least a type of container the user wants the machine to dispense (e.g., whether the user wants an empty container or a container filled with oil, the size of the container, any other desirable container characteristics). The user selection may also include a quantity of containers to dispense. In response to the user selection, the machine may indicate a total price of the transaction and that the user must pay prior to the machine dispensing the containers. If the machine does not receive a response to the query within a designated time-out period (e.g., in thirty seconds, in one minute, in five minutes, etc.), the machine returns to an inactive state and returns to step 301.

The machine receives payment information (step 305). The user can pay for the selected container by inserting money (i.e., coins or bills) into a money-in device of the machine. Alternatively, the user can provide payment information relating to a payment account (e.g., credit or bank account information) to pay for the bottle by swiping a credit card or a prepaid card through a magnetic strip reader of the machine. In another alternative, the user can provide payment information by tapping a payment card having an NFC tag against an NFC transceiver of the machine. In yet another alternative, the user can provide payment information by tapping an NFC enabled mobile device (e.g., a smartphone) running a payment application (e.g., Google Wallet, ISIS, a proprietary machine payment application, etc.). Still further, the user may have a coupon or a voucher for a free or discounted container, in which case the coupon or voucher can be provided to a scanner of the machine such that the price may be adjusted. In some arrangements, the machine may not require a fee for receiving a bottle. In such an arrangement, step 305 is skipped.

While providing payment information, the machine may prompt the user to register for an account or to log into his account with the machine's provider. The account enables the operator of the machine to track user activities such as what types and quantities of containers the user has taken out of the machine, what types and quantities of containers the user has deposited into the machine, how often the user uses the machine, the amount of waste deposited into the machine. The operator of the machine may use this information to provide a loyalty benefit program. For example, the operator of the machine may provide a free container after a certain number of containers have been purchased or deposited.

After receiving payment for the container, the machine retrieves the user-selected container (step 306). The machine retrieves the container by maneuvering a container movement mechanism of the machine (e.g., container movement mechanism 107). The container movement mechanism is configured to pick up, move, and place containers within the housing of the machine. Each container's location within the housing is stored in a controller of the machine. The controller identifies the proper container to be dispensed, maneuvers the movement mechanism into a position to pick up the container, instructs the mechanism to pick up the container, and maneuvers the movement mechanism to place the container into a dispensing area of the machine. The dispensing area of the machine is user accessible (i.e., the user can remove the container from the machine's housing once the container is placed into the dispensing area of the machine). Each container may contain a unique identifier (e.g., barcode 119, QR code 120, or NFC tag 121). While retrieving the container, the controller of the machine may associate the container's unique identification code to the user's account. Further, container information may be stored in a memory of the machine such that the machine can later transmit a report to the machine's operator (e.g., via communication module 204).

After moving the container into the dispensing area of the machine, the machine dispenses the container (step 307). The dispensing area may be located behind a locked door of the machine. In such an arrangement, the machine unlocks the door such that the user can access the dispensing area and remove the container. If a container remains in the dispensing area for a threshold period of time, the machine may issue an audible and/or visual notification to the user (e.g., flashing a light at the user, emitting a beeping noise to the user, etc.).

After dispensing the container, the machine determines if the user overpaid (step 308). If the user provided too much money, to the machine (e.g., by providing a one dollar bill when the container deposit or cost is fifty cents), the machine dispenses change to the user (step 309). As noted above, in some arrangements, the machine does not require a fee for dispensing a container. In such an arrangement, step 308 and step 309 are skipped. After the container has been dispensed and any necessary change has been dispensed, the machine prints a receipt (step 310). The receipt is printed through a printer of the machine. Alternatively, the user may opt to receive the receipt via e-mail or text message. In this case, the controller of the machine formats and sends the receipt via a communications module of the machine (e.g., communication module 204). After the receipt is provided, the machine returns to a standby mode and waits for another user's presence, in which case the method repeats.

Figure 4:
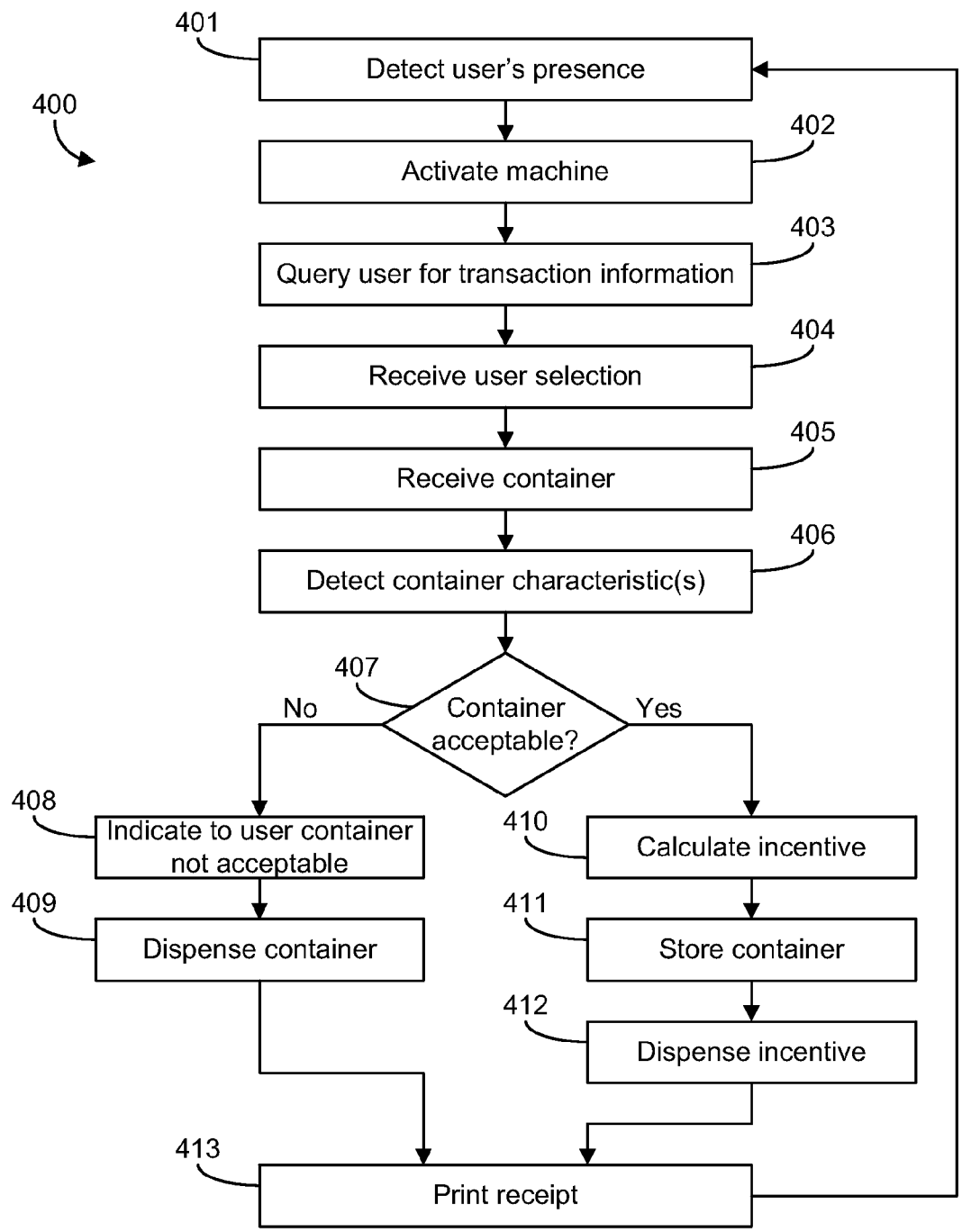
FIG. 4 is a flow diagram of a process of receiving a container of waste in a machine from a user according to an exemplary embodiment.

Referring to FIG. 4, a flow diagram detailing a process 400 of receiving a container of waste in a machine (e.g., machine 100) from a user is shown according to an exemplary embodiment. The method begins when the machine detects the user's presence at the machine (step 401). The user's presence is may be detected by user interaction with a user input (e.g., a touchscreen, a keypad, etc.). Generally, the interaction indicates that the user wishes to deposit a container into the machine in exchange for an incentive (e.g., a coupon, a credit, money, etc.). Alternatively, the user's presence may be detected by a motion detector or a camera mounted on the machine. In yet another alternative arrangement, the user's presence is detected when the user provides loyalty account identification (e.g., by swiping a loyalty card through a magnetic strip reader of the machine, by tapping an NFC enabled loyalty card on an NFC transceiver of the machine, by transmitting loyalty account information from an NFC enabled mobile device such as a smartphone to the NFC transceiver of the machine, etc.). Once the user's presence is detected, the machine is activated (step 402).

After being activated, the machine queries the user for transaction information (step 403). The machine displays the query through a display of the machine to the user. The query asks the user to provide user account information and container deposit information. The user account information may have been previously provided upon the initial interaction with the machine in step 401. The query includes a request for the user to provide information about the container to be deposited including the contents of the container, whether the container is marked with a system identification (e.g., barcode 119, QR code 120, NFC tag 121, etc.), whether the container is a non-system container (e.g., a used container from a gallon of milk, a used soda bottle, etc.). At this point, the machine may also query the user as to whether the user has any promotional vouchers or coupons (e.g., a double deposit value coupon). The user provides the machine the requested information through user input devices on the machine (e.g., a keypad, a touchscreen, a barcode scanner, etc.) (step 404).

After receiving the user input, the machine indicates to the user that it is ready to receive the container, and the machine receives the container (step 405). Generally, the user places the container in a receiving area of the machine. After receiving the container, the machine detects container characteristics (step 406). The machine is configured to detect the shape and the size of the container. The size may be detected through a camera system, a laser scanner, or another system configured to detect the shape and size of the container. The machine is further configured to weigh the container in order to determine the weight of the contents of the container. Additionally, the machine may be configured to detect contents of the container (e.g., through a camera system if the container is clear, by puncturing the container with a chemical probe and resealing the puncture hole, etc.). Further, the machine is configured to detect and read any unique container identifications in the form of barcodes, QR codes, and/or NFC tags on the container. The unique container identification may indicate that the container is linked to a particular account. Further the controller of the machine may cross reference the container identification with a database containing container information (container size, container shape, container tare weight, container dispense date, etc.). If the deposited container does not include a unique container identification, the machine creates a label and applies the label to the container (i.e., prints a label having a barcode or QR code and affixes the coded label to the container), such that a service person can scan the label and determine container information such as the container's weight, contents, size, deposit date, an associated user account, etc.

After detecting container characteristics, the machine determines whether to accept or reject the container (step 407). If the container is to be rejected, the machine indicates to the user that the container is not acceptable through a display of the machine (step 408). The indication may include a reason for the container's rejection. The container may be deemed unacceptable if it contains unaccepted waste product (e.g., metal, non-organic waste, etc.). The container may also be deemed unacceptable if it is of an incompatible size with the machine's storage and/or movement mechanism (i.e., the container is too big, too small, or oddly shaped). After indicating that the container is not acceptable, the container is dispensed back to the user (step 409).

If the container is to be accepted, the machine calculates an incentive for the user (step 410). The incentive may be money, coupons, and/or vouchers. The amount and type of incentive provided is customizable and based on parameters provided by the operator of the machine. The incentive may increase as the quantity of waste deposited in the machine increases. For example, a user depositing one pound of food waste in the machine may receive a lower valued incentive than a user who deposits two pounds of food waste in the machine. Alternatively, the machine may pay out a static incentive regardless of the amount of waste deposited. In some configurations, the machine may pay a higher incentive rate for a first type of identifiable waste and a lower incentive rate for a second type of identifiable waste. For example, the machine may pay thirty cents per pound for deposited used cooking oil and ten cents a pound for deposited food scraps. The amount of the incentive is generally proportional to the weight of the deposited waste.

After calculating the incentive, the machine stores the container (step 411). The machine stores the container by grabbing the container with a container movement mechanism (e.g., container movement mechanism 107) and by maneuvering the container movement mechanism to a location within the machine's housing. The container movement mechanism is configured to pick up, move, and place containers within the housing of the machine. Prior to movement, the controller identifies an area within the housing for storage of the container. Once a location is identified, the controller instructs the movement mechanism to pick up, move, and place the contain in the designated location. The container's location within the housing is stored in a memory of the machine.

After storing the container and calculating the incentive, the machine dispenses the incentive to the user (step 411). The incentive may be in the form of a printed voucher or coupon, in which case the incentive is printed at a printer of the machine. Alternatively, the incentive may be in the form of a monetary incentive. In the case of a monetary incentive, the machine may inquire how the user wishes to receive the incentive. The user can select receive the monetary incentive as bills or coins dispensed from the machine or as a credit to a credit card or bank account. If the user selects to receive the monetary incentive as dispensed cash or coins, the machine is configured to dispense the appropriate amount of coins through a coin-out mechanism and/or the appropriate amount of paper currency bills through a bill-out mechanism. If the user selects to receive the monetary incentive as a credit to a credit card or bank account, the user is required to provide the credit card or bank account information. The machine receives the account information when the user swipes a credit or debit card through a magnetic card reader of the machine. Alternatively, the user provides the account information by tapping a card having an NFC tag against an NFC transceiver of the machine. In yet another alternative, the user provides the account information by tapping an NFC enabled mobile device (e.g., a smartphone) running a payment application (e.g., Google Wallet, ISIS, a proprietary machine payment application, etc.).

After the incentive is dispensed or the container is rejected and dispensed to the user, the machine prints a receipt of the transaction (step 413). The receipt is printed through a printer of the machine. Alternatively, the user may opt to receive the receipt via e-mail or text message. In this case, the controller of the machine formats and sends the receipt via a communications module of the machine (e.g., communication module 204). After the receipt is provided, the machine returns to a standby mode and waits for another user's presence, in which case the method repeats.

Figure 5:
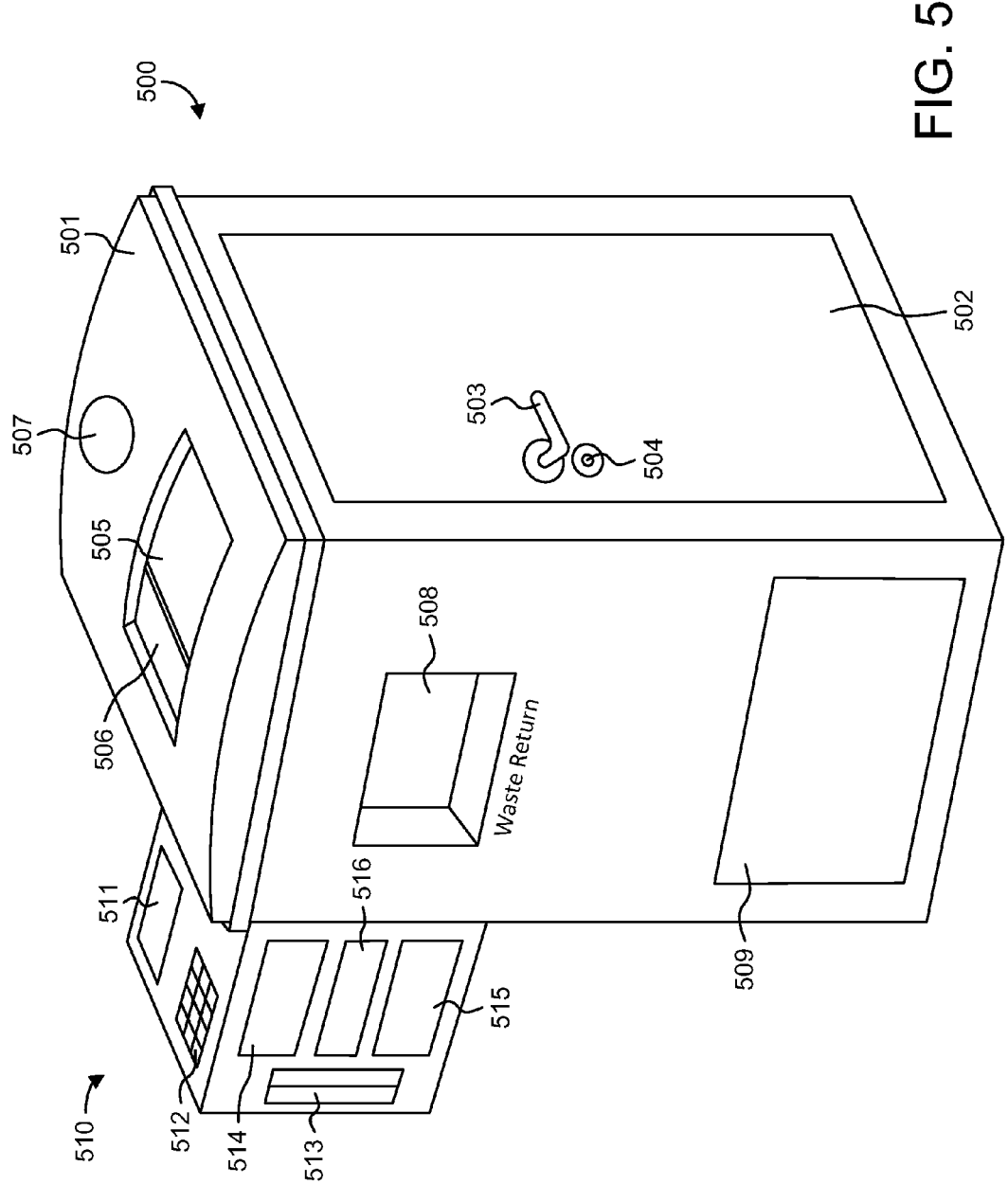
FIG. 5 is a perspective view of a waste collection machine according to an exemplary embodiment.

Referring to FIG. 5, a waste collection machine 500 is shown according to an exemplary embodiment. Machine 500 is generally configured to receive and store food waste and to provide an incentive for a user to deposit food waste into machine 500. Machine 500 includes housing 501. Housing 501 houses necessary components of machine 500. Housing 501 includes door 502. Door 502 provides access to the interior of housing 501. Door includes handle 503 and lock 504. Housing 501 includes receiving portion 505. Receiving portion 505 is configured to enable a user to deposit materials into machine 500. Receiving portion 505 may include door 506. Door 506 automatically opens to provide access to receiving portion 505 or closes to prevent access to receiving portion 505 (e.g., it may be desirable to prevent access to receiving portion 505 when machine 500 is processing waste in order to reduce the chance of injury to the user). Housing 501 may include bottle opening 507 configured to receive cans or bottles to be recycled. Housing 501 includes waste return portion 508. Waste return portion 508 is configured to receive waste or objects that are rejected by machine 500. For example, while depositing food scraps into receiving portion 505, a user may accidentally deposit a metal item (e.g., a set of keys), which are separated from the food scraps and returned to the user at waste return portion 508. Housing also includes advertising panel 509. Advertising panel 509 may be positioned on any part of housing 501. Advertising panel 509 is configured to hold a printed advertisement. Alternatively, advertising panel 509 is a display (e.g., LCD, OLED, TFT, or any other suitable display), configured to display any of an advertisement, promotional information, local news, local weather, the time, etc.

User interaction portion 510 is mounted to housing 501. Alternatively, user interaction portion 510 is integrated with housing 501 such that all user inputs and outputs are substantially flush with at least one surface of housing 501. User interaction portion 510 includes display 511 and keypad 512. Display 511 may be an LCD, OLED, TFT, or any other suitable display. Display 511 may include a touchscreen configured to receive a user input. Keypad 512 is configured to receive a user input. Accordingly, display 511 and keypad 512 are configured to provide communication between a user and machine 500. User interaction portion 510 also includes magnetic strip reader/writer 513, which is configured to read a magnetic strip and to reprogram a magnetic strip (e.g., the magnetic strip of a credit card, the magnetic strip of a debit card, the magnetic strip of a loyalty card, etc.). User interaction portion 510 includes money in/out mechanism 514. Money in/out mechanism 514 is configured to receive coins and paper currency from a user and to provide coins and paper currency to a user. User interaction portion 510 includes printer 515. Printer 515 is configured to print receipts and/or vouchers (e.g., a coupon, a store credit, etc.). Additionally, user interaction portion includes scanner 516. Scanner 516 is configured to scan a barcode, two-dimensional barcode, or an RFID tag. For example, a user may have a received a double incentive coupon having a barcode to use machine 500 or the user has a machine 500 loyalty card with an RFID chip, either of which may be scanned during use of machine 500 to activate certain features or to alter the standard incentive.

Figure 6:
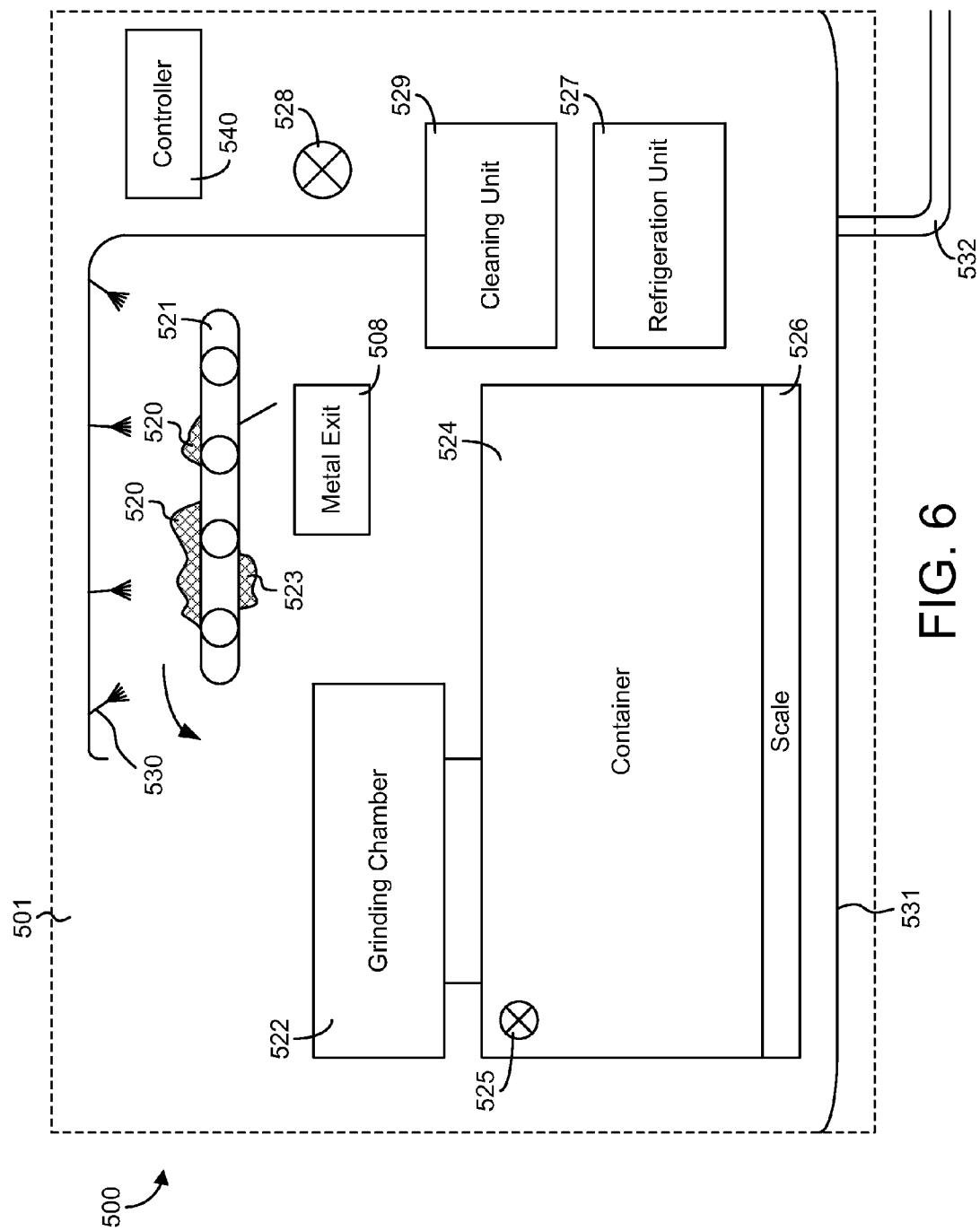
FIG. 6 is an interior view of the waste collection machine of FIG. 5 according to an exemplary embodiment.

Referring to FIG. 6, an interior view of machine 500 is shown according to an exemplary embodiment. Food waste 520 deposited by a user into machine 500 through receiving portion 505 falls onto conveyor 521. Conveyor 521 is configured to move food waste 520 into grinding chamber 522. When food waste 520 reaches the end of conveyor 521, it falls into grinding chamber 522. Grinding chamber 522 may include a chute or funnel to assist in directing food waste 520 into grinding chamber 522. Conveyor 521 is magnetized such that magnetic object 523 (e.g., keys) does not fall off of conveyor 521 and into grinding chamber 522. Magnetic object 523 is returned to the user through waste return 508. Conveyor 521 may include a sensor configured to provide a feedback signal that indicates the presence of magnetic object 523 on conveyor 521 to controller 540. Upon detection of a magnetic object, machine 500 is configured to alert the user (e.g., through a flashing light, through a message presented on display 511, or through an audible alarm).

Food waste 520 that falls into grinding chamber 522 is ground into small and substantially uniform pieces. Grinding chamber 522 grinds food waste 520 such that food waste 520 is broken down into small pieces for more efficient storage in container 524. Grinding chamber 522 utilizes impellers mounted on a spinning disk that forces food waste against a stationary grinding ring or blade. Alternatively, grinding chamber 522 utilizes spinning blades to chop food waste 520 into small pieces. In yet another alternative arrangement, grinding chamber 522 includes a pair of opposing rollers that grind food waste 520 into a smaller size. After being ground or chopped into small, substantially uniform pieces, food waste 520 falls into container 524. Container 524 and grinding chamber 522 may be connected with a pipe. A pump may be used to assist in moving the ground food waste from grinding chamber 522 into container 524. Container 524 includes tank sensor 525 configured to provide a feedback signal indicative of the level of waste in container 524 to controller 540. Scale 526 measures the weight of container 524 and provides a feedback signal indicative of the weight to controller 540.

Machine 500 includes refrigeration unit 527. Refrigeration unit 527 regulates the temperature of all components inside of housing 501. Alternatively, refrigeration unit 527 only regulates the temperature of container 524. Refrigeration unit 527 is activated and deactivated by controller 540 based on feedback signals from temperature sensor 528. Temperature sensor 528 monitors the temperature within housing 501. Alternatively, temperature sensor 528 monitors the temperature of container 524.

Machine 500 includes cleaning unit 529. Cleaning unit 529 is configured to spray a cleaning solution within housing 501 through sprayers 530. Accordingly, cleaning unit 529 may include an integral cleaning solution storage tank. Alternatively, cleaning unit 529 is connected to an external water source (e.g., an external water tank, external plumbing system, etc.) and water is used to dilute a cleaning solution concentrate stored in a container within cleaning unit 529. Cleaning unit 529 includes a pump configured to pump the cleaning solution through sprayers 530. Sprayers 530 are aimable such that the cleaning solution may be sprayed onto any portion of housing 501 or onto any component within housing 501 (e.g., onto conveyor 521, onto or into grinding chamber 522, onto or into container 524, etc.). The sprayed cleaning solution may be a disinfectant, a deodorizer, a degreaser, an antibacterial solution, or any combination thereof. Additionally, the sprayed cleaning solution washes debris off of components within housing 501. Further, cleaning unit 529 may provide cleaning solution directly to grinding chamber 522, container 524, and any piping connecting the two. Debris and used cleaning solution are captured by basin 531, which funnels the debris and cleaning solution out of housing through drainage pipe 532. Drainage pipe 532 may drain into a secondary waste tank or directly into an external sewage system.

Figure 7:
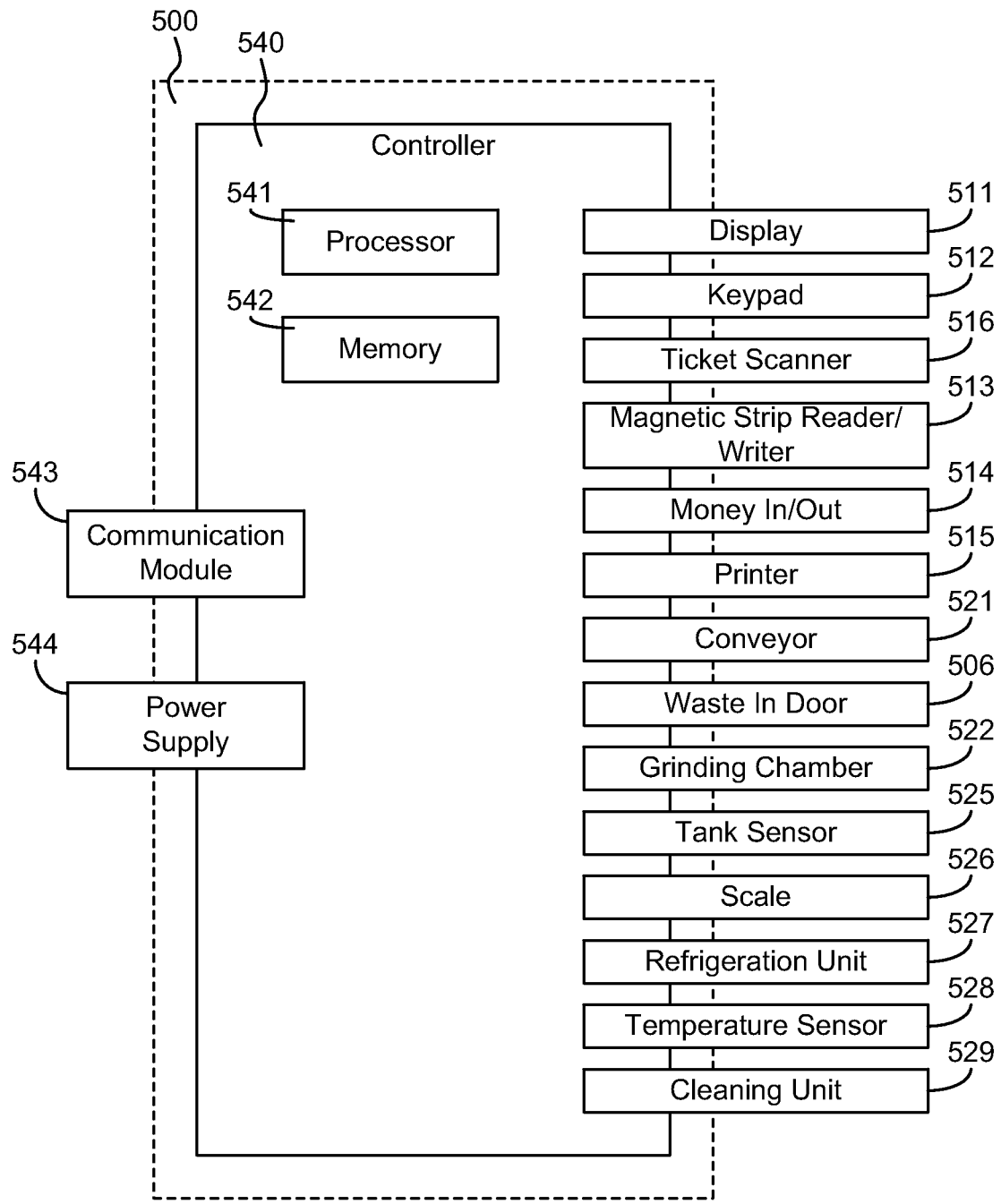
FIG. 7 is a block diagram of the waste collection machine of FIG. 5 according to an exemplary embodiment.

Referring to FIG. 7, a block diagram of controller 540 is shown according to an exemplary embodiment. Controller 540 generally controls the operation of machine 500. Controller 540 includes processor 541 and memory 542. Memory 542 stores programming modules that, when executed by processor 541, control the operation of machine 500. Controller 540 is in communication with and operatively connected to display 511, keypad 512, scanner 516, magnetic strip reader/writer 513, money in/out mechanism 514, printer 515, conveyor 521, door 506, grinding chamber 522, tank sensor 525, scale 526, refrigeration unit 527, temperature sensor 528, and cleaning unit. Accordingly, controller 540 is configured to operate these components to receive input from a user, provide output to the user, receive waste from the user, process and store the received waste, and provide an incentive and/or a receipt to a user based on the amount of waste deposited.

Controller 540 is further in communication with and operatively connected to communication module 543. Communication module 543 is configured to transmit and receive data to and from outside sources (e.g., a central server). Communication module 543 is wired or wireless. Communication module 543 utilizes any of the 802.11 standard networking protocol (e.g., 802.11a/b/g/n), CDMA, GSM, LTE, Bluetooth®, and/or Ethernet. Controller 540 receives instructions from external computing devices through communication module 543 (e.g., operation schedules, shutdown commands, requests for information and statuses, etc.). Controller 540 also sends commands and data to external computing devices through communication module 543. For example, when controller 540 determines that container 524 is full, controller 540 may initiate a message to the operator of machine 500 indicating that container needs to be replaced or emptied. Further, controller 540 may upload regular reports that include information such as usage history, pay-out information, amount of deposited waste, amount of remaining cleaning solution, etc.

Machine 500 and all of the components of machine 500 are powered by power supply 544. The electrical source of power supply 544 is any of grid power, battery power, and/or solar power. It is contemplated that multiple power sources are used (e.g., a primary power source of solar power and a backup power source of grid power in the event the solar power source cannot provide enough electrical energy to operate machine 500).

Figure 8:
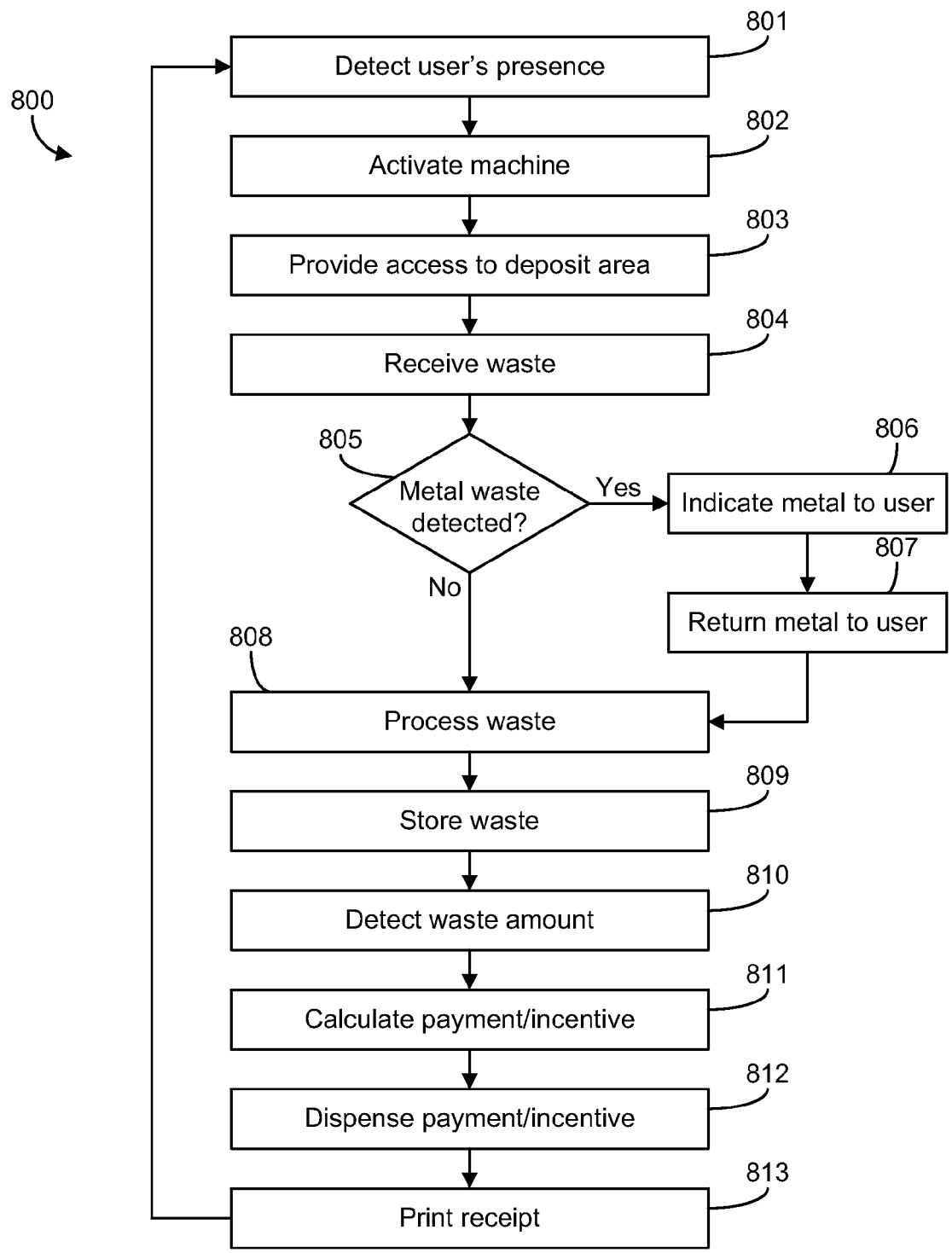
FIG. 8 is a flow diagram of a process of receiving waste in a machine according to an exemplary embodiment.

Referring to FIG. 8, a flow diagram detailing a process 800 of receiving waste in a machine (e.g., machine 500) and providing an incentive is shown according to an exemplary embodiment. The method begins when the machine detects the user's presence at the machine (step 801). The user's presence is may be detected by user interaction with a user input (e.g., a touchscreen, a keypad, etc.). Generally, the interaction indicates that the user wishes to deposit waste into the machine in exchange for an incentive (e.g., a coupon, a credit, money, etc.). Alternatively, the user's presence may be detected by a motion detector or a camera mounted on the machine. In yet another alternative arrangement, the user's presence is detected when the user provides loyalty account identification (e.g., by swiping a loyalty card through a magnetic strip reader of the machine, by tapping an NFC enabled loyalty card on an NFC transceiver of the machine, by transmitting loyalty account information from an NFC enabled mobile device such as a smartphone to the NFC transceiver of the machine, etc.). Once the user's presence is detected, the machine is activated (step 802).

After being activated, the machine provides the user access to a deposit area of the machine (e.g., by opening door 506 of machine 500) (step 803). The machine then instructs the user to deposit the waste into the deposit area through a display of the machine, and the machine receives the deposited waste (step 804). The machine determines if any magnetic metal was received with the deposited waste (step 805). If metal was received, the machine indicates the presence of metal to the user (step 806). The machine alerts the user to the presence of metal (e.g., a set of keys accidentally deposited with the waste), through an audible alarm and/or through a message presented to the user on a display of the machine. After alerting the user, the metal is separated from the waste and returned to the user through a metal return mechanism (step 807). For example, the metal may be magnetically separated as the waste is routed to a processing station (e.g., by magnetic conveyor 521 of machine 500).

The machine processes the waste in a processing station of the machine (step 808). The waste is processed for more efficient storage. For example, food scraps, such as a bone or an apple core, may take up an unnecessary amount of space in a storage container due to awkward sizes and shapes. The machine processes the waste into smaller pieces by grinding, pulverizing, compressing, and/or chopping. After processing, the machine stores the waste in a storage container (step 809). The waste may fall naturally from the processing station into the storage container. Alternatively, a pump may facilitate the movement of the waste into the storage container. The machine determines the amount of waste the user deposited (step 810). The machine includes a scale configured to weigh the container before and after each deposit of waste is made. The change in weight of the container represents the amount of waste deposited by the user.

The machine calculates an incentive for the user based on the amount of waste deposited (step 811). The incentive may be money, coupons, and/or vouchers. The amount and type of incentive provided is customizable and based on parameters provided by the operator of the machine. The incentive may increase as the quantity of waste deposited in the machine increases. For example, a user depositing one pound of food waste in the machine may receive a lower valued incentive than a user who deposits two pounds of food waste in the machine. The amount of the incentive is generally proportional to the weight of the deposited waste.

After calculating the incentive, the machine dispenses the incentive amount to the user (step 812). The incentive may be in the form of a printed voucher or coupon, in which case the incentive is printed at a printer of the machine. Alternatively, the incentive may be in the form of a monetary incentive. In the case of a monetary incentive, the machine may inquire how the user wishes to receive the incentive. The user may opt to receive the monetary incentive as bills or coins dispensed from the machine or as a credit to a credit card or bank account. If the user selects to receive the monetary incentive as dispensed cash or coins, the machine is configured to dispense the appropriate amount of coins through a coin-out mechanism and/or the appropriate amount of paper currency bills through a bill-out mechanism. If the user selects to receive the monetary incentive as a credit to a credit card or bank account, the user is required to provide the credit card or bank account information. The machine receives the account information when the user swipes a credit or debit card through a magnetic card reader of the machine. Alternatively, the user provides the account information by tapping a card having an NFC tag against an NFC transceiver of the machine. In yet another alternative, the user provides the account information by tapping an NFC enabled mobile device (e.g., a smartphone) running a payment application (e.g., Google Wallet, ISIS, a proprietary machine payment application, etc.).

After the incentive is dispensed to the user, the machine provides a receipt of the transaction (step 813). The receipt is printed through a printer of the machine. Alternatively, the user may opt to receive the receipt via e-mail or text message. In this case, the controller of the machine formats and sends the receipt via a communications module of the machine (e.g., communication module 543). After the receipt is provided, the machine returns to a standby mode and waits for another user's presence, in which case the method repeats.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the enclosure may be constructed from any of a wide variety of materials that provide sufficient strength or durability, in any of a wide variety of colors, textures, and combinations. Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word "exemplary" is intended to present concepts in a concrete manner. Accordingly, all such modifications are intended to be included within the scope of the present inventions. The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes, and omissions may be made in the design, operating conditions, and arrangement of the preferred and other exemplary embodiments without departing from scope of the present disclosure or from the spirit of the appended claims.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps, and decision step.

What is claimed is:

1. An apparatus for receiving waste contained in a container comprising:
    a housing;
    a receiving mechanism coupled to the housing and configured to receive the container;
    an analysis mechanism coupled to the housing and configured to analyze the container, wherein the analysis mechanism includes a camera configured to take a picture of the container;
    a first compartment within the housing, the first compartment configured to store the container;
    a movement mechanism coupled to the housing and configured to transport the container from the receiving mechanism to first compartment;
    a refrigeration unit coupled to the housing and configured to refrigerate the first compartment;
    a display coupled to the housing; and
    a printer coupled to the housing.

2. The apparatus of claim 1, wherein the display is a touchscreen display configured to receive a user input and to display an output.

3. The apparatus of claim 1, wherein the analysis mechanism is a scale configured to determine a weight of content of the container.

4. The apparatus of claim 1, wherein the analysis mechanism is a scanner configured to scan any of a barcode on the container, a matrix barcode on the container, and a near field communication tag of the container.

5. The apparatus of claim 1, further comprising:
    a second compartment within the housing, the second compartment configured to store an empty container; and
    an access compartment configured to provide a user access to contents of the access compartment;

wherein the movement mechanism is further configured to transport the empty container from the second compartment to the access compartment such that a user can remove the empty container from the access compartment.

6. The apparatus of claim 1, further comprising a payment mechanism including any of a credit card reader, a bill in device, a bill out device, a coin in device, a coin out device, and a near field communication sensor.

* * * * *